United States Patent
Zhang

(10) Patent No.: US 11,310,465 B1
(45) Date of Patent: Apr. 19, 2022

(54) VIDEO CONFERENCE TEMINAL AND SYSTEM THERE OF

(71) Applicant: AMPULA INC., Bellevue, WA (US)

(72) Inventor: Yajun Zhang, San Jose, CA (US)

(73) Assignee: AMPULA INC., Bellevue, WA (US)

( * ) Notice: Subject to any disclaimer, the term of this patent is extended or adjusted under 35 U.S.C. 154(b) by 0 days.

(21) Appl. No.: 17/204,905

(22) Filed: Mar. 17, 2021

(51) Int. Cl.
| H04N 7/15 | (2006.01) |
| H04N 7/14 | (2006.01) |
| H04N 9/31 | (2006.01) |
| H04S 7/00 | (2006.01) |
| G10L 25/57 | (2013.01) |

(52) U.S. Cl.
CPC ............. *H04N 7/155* (2013.01); *H04N 7/142* (2013.01); *H04N 9/3141* (2013.01); *G10L 25/57* (2013.01); *H04S 7/303* (2013.01)

(58) Field of Classification Search
CPC  H04N 7/15; H04N 7/14; H04N 7/147; H04N 9/31; H04L 65/403
USPC .......................................... 348/14.01–14.16
See application file for complete search history.

(56) References Cited

U.S. PATENT DOCUMENTS

| 6,486,867 | B1 * | 11/2002 | Kopp ....................... G02B 1/00 345/108 |
| 9,374,554 | B1 * | 6/2016 | Poulad ............... H04N 5/23238 |
| 2012/0019560 | A1 * | 1/2012 | Inoue .................... H04L 67/148 345/634 |
| 2012/0056971 | A1 * | 3/2012 | Kumar .................. H04L 65/403 348/14.02 |
| 2015/0160913 | A1 * | 6/2015 | Lee ........................ G06F 3/1454 345/2.2 |
| 2015/0358473 | A1 * | 12/2015 | Goguen ............ H04M 1/72463 455/411 |
| 2019/0313031 | A1 * | 10/2019 | Zhang ................ G06K 9/00228 |
| 2020/0099889 | A1 * | 3/2020 | Sugihara ............... H04N 7/147 |

* cited by examiner

*Primary Examiner* — Melur Ramakrishnaiah

(57) ABSTRACT

A video conference terminal, comprises a camera device configuring to collect conference video of the video conference terminal; a smart terminal configuring to realize data interaction and information processing with other video conference terminals, transmit conference information to a projection device in real time, and display content of the video conference terminal on splitting screens; the projection device enlarges and displays the conference information sent by the smart terminal and Internet realizes connections of a plurality of video conference terminals. And a video conference system, comprises a control module configuring to process images and voices and realize split-screen display according to the information of images and voices; a conference module configuring to start up a conference mode according to information received by a receiving/sending module; the receiving/sending module is configured to receive and send information, and send the information to the conference module or the control module.

12 Claims, 5 Drawing Sheets

VIDEO CONFERENCE TEMINAL AND SYSTEM THERE OF

TECHNICAL FIELD

The present disclosure relates to the technical field of remote video conference, and particularly to a video conference device, and a video conference system.

BACKGROUND

With the rapid development of society, video conference has become a convenient and efficient way of remote communication, comparing with traditional face-to-face conference, it fully meets the time cost requirements of current society. Compared with a teleconference, a video conference can not only obtain the voice information of the other party in real time, but also observe the image information of the other party's facial expressions in real time, so that participants can more intuitively obtain the necessary content of the conference, and have an immersive experience.

The current video conferencing system mainly has two categories. One is cloud video conference based on software applications. This type of conferencing system mainly relies on software applications provided by computers or mobile phones and other screen-equipped terminals. The organization and the implementation of video conference under coordination is suitable for multiple individuals to join a group conference. Each person can only display his image information, they can not have the immersive feeling of a face-to-face conference, which greatly reduces the effect of the conference. The other is a hardware-based video conference system. By combining cameras, TV screens, speakers, microphones, and conference control equipment (such as computers), each participant can only see an area captured by the camera. There is also no way to feel immersive, which makes the effect of the conference greatly reduced.

How to realize the realism of the conference of the conference system and improve the effect of the conference is a problem that cannot be solved by the current conference system.

SUMMARY

The disclosure provides a video conference system that can display different scenes of the conference according to the needs of the conference, so as to realize the immersive effect of face-to-face conference in the remote conference.

In order to solve the above technical problems, the present disclosure provides a video conference terminal, which includes a smart terminal, a projection device, a camera device, and the Internet, wherein the camera device is configured to collect conference videos of the video conference terminal; the smart terminal is configured to realize data interaction and information processing with other video conference terminals, and transmit conference information to the projection device in real time. The projection device is configured to enlarge and display the conference information sent by the smart terminal, the Internet is configured to realize the connections of a plurality video conference terminals.

The present invention also provides a video conference system, a conference module, a control module, and a receiving/sending module; the control module is configured to process images and voices and realize split-screen display based on the images and voice information: the conference module is configured to start up the conference mode according to the information received by the receiving/sending module; the receiving/sending module is configured to receive and send information, and send the information to the conference module or the control module.

BRIEF DESCRIPTION OF THE DRAWINGS

In order to more clearly explain the technical solutions in the embodiments of the present disclosure, drawings needed for the description of the embodiments will be simply introduced below. Obviously, the drawings mentioned hereafter just illustrate some embodiments of the present disclosure. For those of ordinary skill in the art, other drawings may also be obtained from these drawings without any creative work. In the drawings.

The present disclosure will be further described in the following embodiments with reference to the accompanying drawings.

DETAILED DESCRIPTION OF PREFERRED EMBODIMENTS

The technical solutions in the embodiments of the present disclosure will be clearly and completely described below in conjunction with the drawings in the embodiments of the present disclosure. Obviously, the described embodiments are only a part of the embodiments of the present disclosure, rather than all the embodiments thereof. Based on the embodiments in this disclosure, all other embodiments, obtained by those skilled in the art without any creative work, shall fall within the protection scope of this disclosure.

The present disclosure aims to solve the problem that users in the existing video conference system cannot feel immersive when using the video conference system, thereby reducing the effect of the video conference. The conference system of the present disclosure brings a new video conference experience to users, and can make all parties of the video conference feel like a face-to-face conference, thereby improving the effect of the conference.

Figure 1:
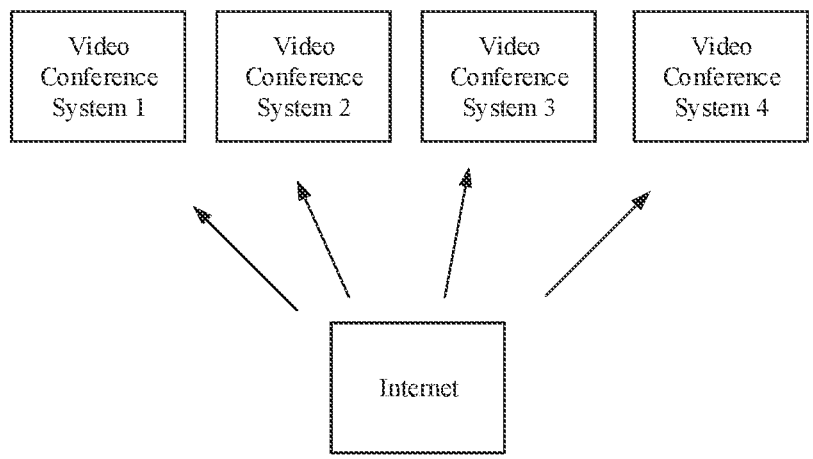
FIG. 1 is a schematic diagram of a structure of the video conference terminal.

The schematic diagram of the video conference system of the present disclosure is as shown in FIG. 1. The video conference system includes multi-party conference participants, and all conference participants are connected with each other through the network.

The participants in the video conference system include multiple parties, as shown in FIG. 1, including a video conference terminal 1, a video conference terminal 2, a video conference terminal 3, etc., and all parties of the video conference terminal are connected via the Internet, thereby realize multi-party remote conference. The number of participants of the video conference terminal is not limited, and it can be more than two parties, which overcomes the limitation of the traditional video conference terminal that the participants being only to two parties.

Figure 2:
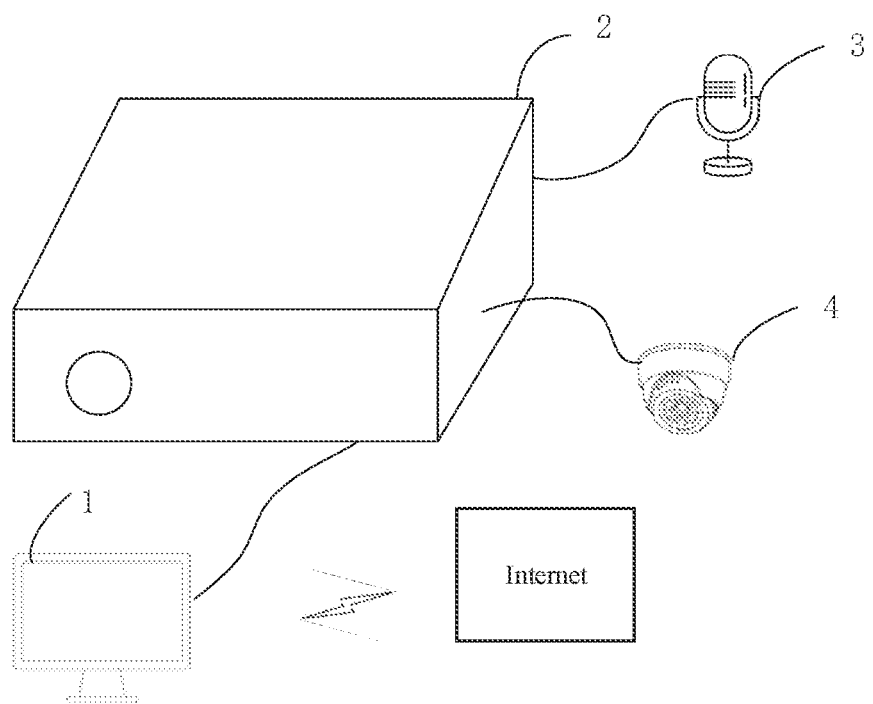
FIG. 2 is a schematic diagram of a video conference terminal of a conference participant.

FIG. 2 shows an embodiment of a video conference terminal. The video conference terminal includes: a smart terminal 1, a projection device 2, a voice device 3, a camera device 4, and Internet. The smart terminal 1 can be a smart device such as a smart phone, a computer, etc. The smart terminal 1 is configured to realize data interaction and information processing with other video conference terminals, and transmit the conference information to the projection device 2 in real time. At the same time, collect information of each video terminal, to realize the split-screen display of the content of the video terminals of all parties; the projection device 2 is configured to enlarge and display the video information or conference information in the smart device to achieve a better display effect, so as to provide users with a face-to-face communication experience. The voice device 2 may be a device with voice input and output functions, the camera device 4 may be a device with photographing or video recording functions, such as a camera.

The camera device 4 is used to obtain panoramic video of the conference scene. The camera device 4 includes a camera. The camera can be a wide-angle camera, which can be a 360-degree panoramic camera or a camera that covers a part scene. Two or three wide-angle cameras can be applied. Each wide-angle lens supports with higher resolutions such as 1080P or 4K, all the videos collected by the wide-angle lens can be spliced with software to generate high-definition video of 360-degree scenes, and the high-definition panoramic video remains 1080P. During the conference, all participants in the conference can be tracked in real time by performing artificial intelligence (AI) image analysis on the panoramic video, and the speakers can be located and identified; the camera device 4 can transmit the collected image information to smart devices.

The voice device 3 is configured to collect voice signals. The voice device 3 can be a microphone, which can support a microphone array with a 360-degree surround in the horizontal direction. It can use a Micro Electro Mechanical System (MEMS, Micro Electro Mechanical System) microphone array with 6 horizontal planes to evenly surround the digital having a Pulse Density Modulation (PDM) function for far and near field interaction, or a 6+1 microphone array, with a microphone in the middle, to capture far field audio. Specifically, a digital microphone array can use beamforming technology to suppress the pickup in the non-target direction to achieve the purpose of noise suppression. It can also enhance the human voice within the angle of the sound source, and transmit the processed voice signal to the smart device.

In order to achieve a better interaction effect, the video conference terminal realizes the voice interaction of each video conference terminal. During the voice interaction process, the smart terminal shares the collected voice information with other video conference terminals. At the same time, according to the voice source of the video conference terminal, determine the speaker of a video conference terminal, and display the image information collected by multiple video conference terminals on split-screens. The speaker is displayed in the main screen display area, and the images collected by other video conference terminals are displayed in sub-screen display area. The main screen display area is a main area of the video display area, and the sub-screen display area is other areas displayed around the main screen display area. The main screen display area displays the video information of a video conference terminal, and the sub-screen display area displays the video information of other video conference terminals. When there are multiple other video conference terminals, the sub-screen display area will further split the screen display area of the sub screen display area. The split screen processing method can follow up the mapping list in advance and display it in the corresponding position, or according to the order of entering the conference and display in the corresponding position.

The voice device 3 sends the collected voice information to the smart terminal, and the voice information collected by the voice device 3 is also configured to collect voice location information. When the voice device 3 is capable of collecting voice location information, the camera device 4 is provides as an automatically adjusted camera device. The camera device 4 automatically adjusts the photographing area of the camera device according to the position information of the voice, and locates the photographing area to the position of the voice input. Therefore, a special display for the conference speaker can be realized, which is beneficial for other parties of the video conference terminal to clearly obtain information such as the facial expression of the conference speaker, so as to better realize face-to-face communication.

In the present disclosure, the projection device 2 of the video conference terminal may be multiple or one. The projection device 2 may be applied. Both the voice device 3 and the camera device 4 may be a voice device or a camera device of the smart device 1.

The smart terminal is also configured to split the screen of the image information of different video conference terminals, and perform enlarged split-screen display through the projection device. The split-screen display of the smart terminal is configured to identify, the voice information of the receiving voice device 3, and according to the source of the voice information, display the video information of the designated conference terminal where the voice device 3 is located in the main screen display area.

Figure 3:
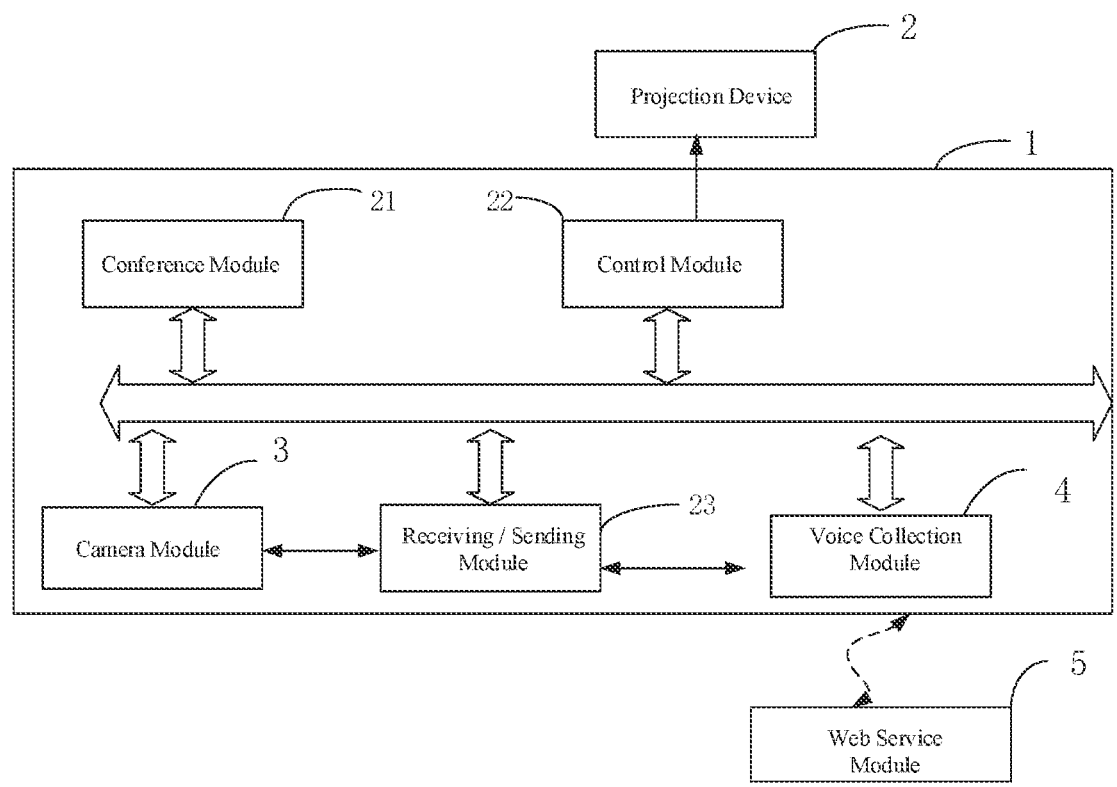
FIG. 3 is a working schematic diagram of a video conference system in an embodiment.

FIG. 3 shows a working principle diagram of a video conference system, including: a conference module 21, a control module 22, and a receiving/sending module 23. The control module 22 is configured to process images and voices and realize split-screen display according to the image and voice information; the conference module 21 is configured to initial the conference mode according to the information received by the receiving/sending module 23; the receiving/sending module 23 is used to receive and send information to the conference module or control module.

The camera module 3 and the voice collection module 4 may also be included. The camera module 3 sends the image/video information collected by the camera module 3 to the receiving/sending module 23. The voice collection module 4 is configured to collect the input voice information and send it to the receiving/sending module 23.

One or more display devices of the projection module 2 may be configured to display the video/image information sent by the control module 23. The projection module 2 can be a projector or an electronic display screen.

The web service module 5 realizes the network connection function, which is configured to transmit the data of the video conference system, and realize the interaction of the remote multi-parties video conference system.

Figure 4:
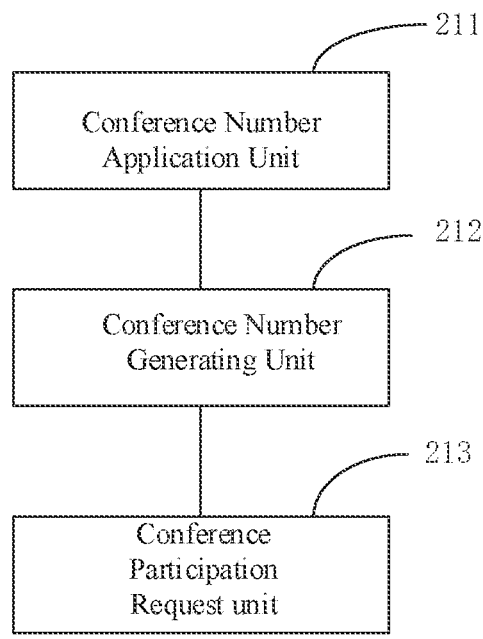
FIG. 4 is a working schematic diagram of a conference module in an embodiment.

FIG. 4 is a schematic diagram of the conference module 21. The conference module 21 includes a conference account application unit 211, a conference number generating unit 212, and a conference participation request unit 213. The conference account application unit 211 is configured to receive the information requested by the conference applicant and record the information of the conference user; the conference number generating unit 212 is used to generate the conference number and/or password according to the information of the conference number application unit; The conference participation request unit 213 is configured to receive the user's conference application, and send the conference application information to the control module 22.

In this embodiment, the information requested by the conference applicant includes conference user information, conference subject, conference content, and other information. The conference user information includes the number of participants and the identity information of the participants in the conference, etc. Wherein, after requiring the user's information including the identity information of the conference participants, the conference number generating 212 unit generating the conference number, the password information may not be generated. The user can directly request to join the conference based on the identity information. This solution makes the operation of conference participants more concise. The conference number application unit 211 may store the information of the conference host and the information of the conference participants according to the users input, and the conference host may receive the participation of the user according to the conference participation request unit 213. This solution can make the conference procedure more controllable.

When the user's information does not include the identity information of the conference participants, the conference number generating unit generates the conference number and password. This setting method can ensure the confidentiality, security and fluency of the conference, and prevent the stranger from entering the conference, leaking the content of the conference or disrupt the conference process.

Figure 5:
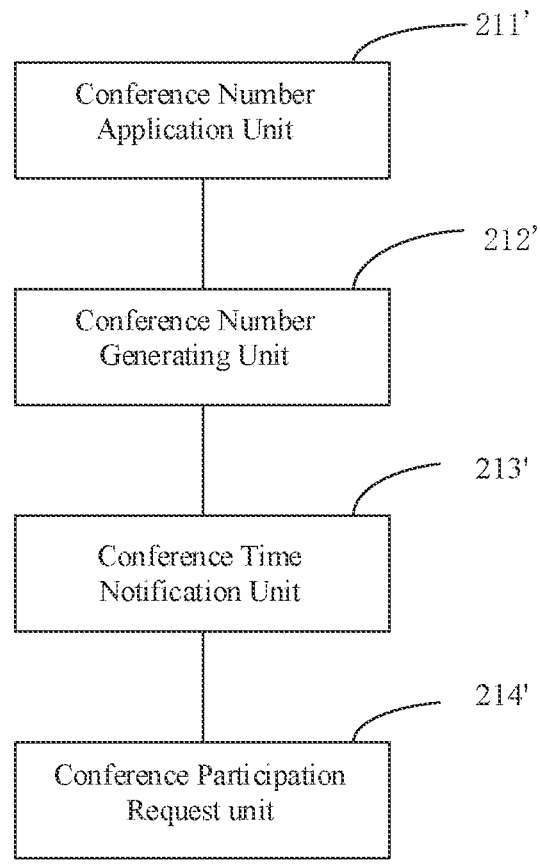
FIG. 5 is a working schematic diagram of a conference module in another embodiment.
Figure 6:
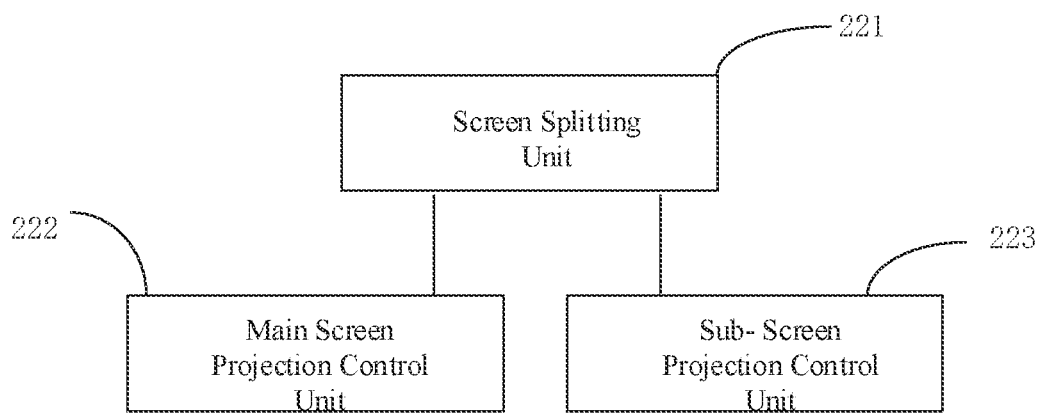
FIG. 6 is a working schematic diagram of a control module in an embodiment.

FIG. 5 is another embodiment of the present disclosure. The conference module 21 includes a conference number application unit 211', a conference number generating unit 212', a conference time notification unit 213', and a conference participation request unit 214'. The conference number application unit 211' may be configured to receive the information requested by the conference applicant and record the conference user's information; The conference user's information includes mobile phone number information or email information. The conference number generating unit 212' is configured to generate a conference number and/or a password according to the information of the conference number application unit 211'; the conference participation request unit 213' is configured to receive a user's conference application, and send the conference application information to the control module 22; The conference notification unit 214' is used to send the conference number and/or password generated by the conference number generating unit 212' to the conference participants, and according to the conference time and conference schedule scheduled in the conference number application unit 211', the conference time and the conference schedule is sent to the conference participants. In this embodiment, a conference notification unit 214' is added to the previous embodiment, and the conference system directly notifies the conference participants, which reduces the work of the conference host/initiator.

At the same time, the conference notification unit 214' in this embodiment also includes a reminder function to notify the conference participants again before the conference starts, so as to prevent the conference participants from forgetting the conference time. The reminder can notify the participants of the conference according to the notice time set by the host/initiator in the conference number application unit 211', for example, one day before the beginning of the conference and 20 minutes before the beginning of the conference. On the one hand, the conference notification serves as a reminder function, and on the other hand, it also helps users know the content of the conference in advance, so as to prepare conference items in advance and improve efficiency of conference.

FIG. 5 is an embodiment of the control module 22. In this embodiment, the control module 221 includes a screen splitting unit 221, a main screen projection control unit 222, and a sub-screen projection control unit 223. The screen splitting unit 221 dynamically sets the display areas of the main screen and the sub-screen according to the content of the conference. The main screen control unit 222 is configured to control the content display of the main screen. The sub-screen projection control unit 223 is configured to control the display position and display information of the sub-screen for the conference participants. Wherein, the screen splitting unit 221 divides the display area according to the current state of the user and the number of display areas of the user, and controls the display size and display position of the display area.

Figure 8:
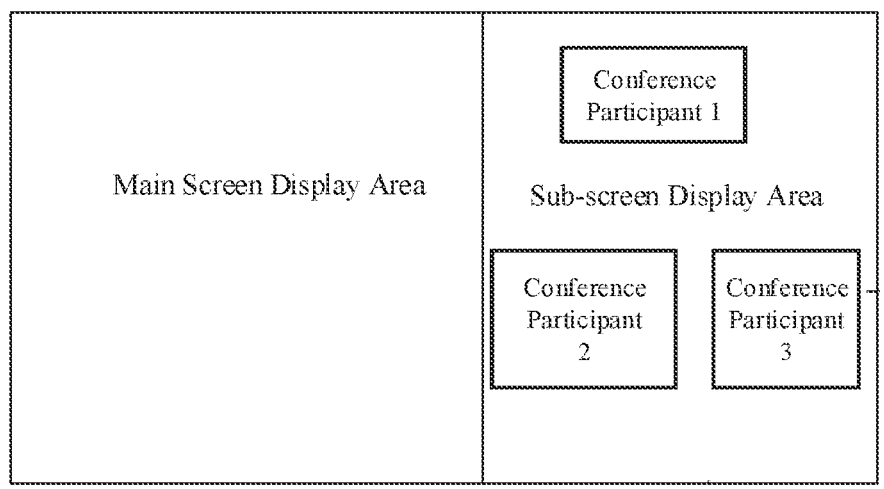
FIG. 8 is a schematic diagram of split-screen display.
Figure 9:
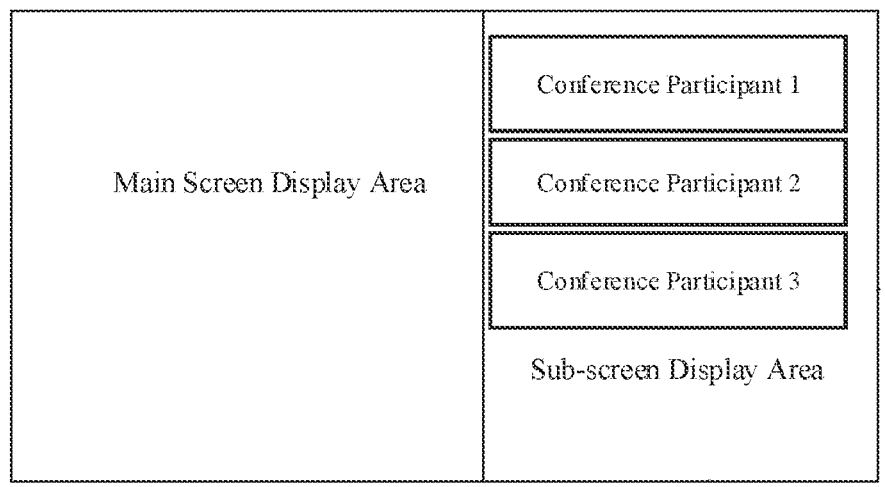
FIG. 9 is another schematic diagram of split-screen display.

FIG. 8 is the display mode after the control module 22 realizes the screen splitting in this embodiment. The main screen projection control unit 222 controls the display of the main display area, and the sub-screen projection control unit 223 controls the display information of the conference participants. FIG. 9 is another display mode after the control module 22 realizes the screen splitting in this embodiment.

Figure 7:
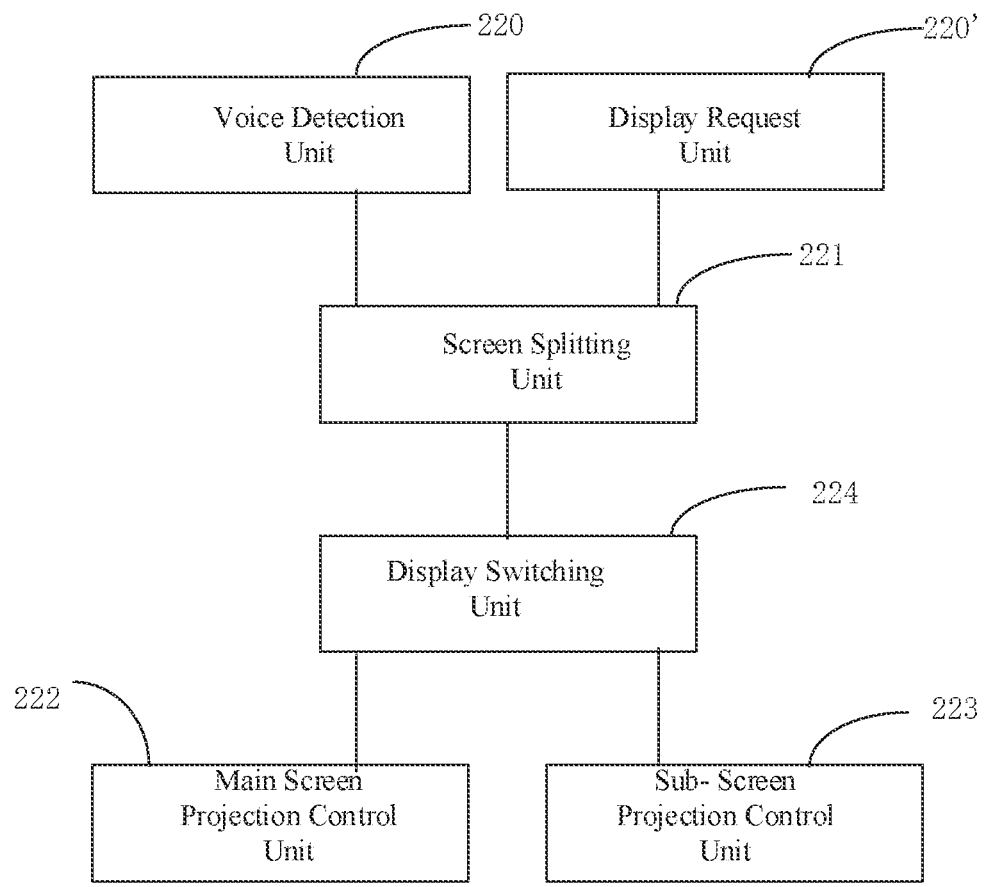
FIG. 7 is a working schematic diagram of a control module in another embodiment.

The control module 22 controls the display of the conference participants in the main screen display area or the sub-screen display area according to the number of conference participants and the current status of the conference participants. For the split-screen display of the control module 22, another embodiment is proposed in FIG. 7. The control module 22 includes a voice detection unit 220, which is configured to detect the source of the voice and send it to the screen splitting display unit 221. The screen splitting display unit 221 controls the display position of the conference participants according to the source of the voice. The display request unit 220' is used to receive a request from a conference participant, and send the request to the screen splitting unit 221. The screen splitting unit 221 controls the display position of the conference participant according to the request of the conference participant. The display switching unit 224 switches the display area where the conference participants are located according to the display positions of the conference participants determined by the screen splitting unit 221. The main screen projection control unit 222 is configured to control the content display of the main screen. The sub screen projection control unit 223 is configured to control the display position and display information of the conference participants in the sub-screen.

After the screen splitting unit 221 receives the voice information of the participant, it instructs the display switching unit 224 to move the conference participant in the current main screen display area to the sub-screen display area, and switch the conference participant of the current voice input party to the main screen display area. When a conference participant requests a file to be displayed and the screen splitting unit 221 receives the request information from the conference participant, it instructs the display switching unit 224 to move the conference participant in the current main screen display area to the sub-screen display area, and display the requested file on the main screen. In this embodiment, through the split-screen display of the screen splitting unit 221, display the display area of the display switching unit 224 switched, so that conference participants can have a better conference experience and can achieve a face-to-face projection conference effect.

The conference system 1 of the present disclosure is connected with the projection display module 2, and the conference participants' information or file information of the conference system is displayed on a large screen through the projection display module 2. The projection display module 2 may be one or more projectors. In the case that the projection display module 2 is a projector, the main screen display area and the sub-screen display area are displayed by the same projector, in the case of multiple projectors, the main screen display area and the sub-screen display area can be displayed on different projectors, thereby further improving the user experience.

The foregoing embodiments of the present disclosure do not limit the scope of the present disclosure. Any equivalent structure or equivalent process transformation made using the content of the specification and drawings of this application, or directly or indirectly applied to other related technical areas, should be included in the scope of patent protection of this disclosure.

What is claimed is:

1. A video conference terminal, comprising:
a camera device configured to collect conference videos of the video conference terminal;
a projection device;
a smart terminal configured to realize data interaction and information processing with other video conference terminals, transmit conference information to the projection device in real time, and display content of the video conference terminal on splitting screens;
wherein the projection device is configured to enlarge and display the conference information sent by the smart terminal and Internet is configured to realize connections of a plurality of video conference terminals,
the video conference terminal further comprising:
a voice device configured to collect voice information of the video conference terminal and send the collected voice information to the smart terminal, the voice device comprises a digital microphone array adopting beamforming technology to suppress pickup in a non-target direction;
a voice detection unit configured to detect a source of a voice collected by the voice device;
a split-screen display unit configured to control display positions of conference participants according to the source of the voice; and
a display switching unit configured to move a conference participant currently in a main screen display area to a sub-screen display area, and switch a conference participant of a current voice input party to the main screen display area, according to the display positions of the conference participants determined by the split-screen display unit;
wherein the display switching unit is further configured to move the conference participant currently in the main screen display area to the sub-screen display area, and display a requested file on the main screen display area, when the file is requested to be displayed; and
wherein the main screen display area and the sub-screen display area are adjacent to each other, the main screen display area has a larger size than the sub-screen display area, the main screen display area is configured to display conference image/video information or the requested file of one conference participant, and the sub-screen display area is configured to display conference image/video information of other conference participants.

2. The video conference terminal according to claim 1, wherein the smart terminal realizes split-screen display of the plurality of conference terminals according to input voice information.

3. The video conference terminal according to claim 2, wherein the camera device is a device with position adjustable;
the voice device is further configured to locate voice location information;
the smart terminal is further configured to generate a camera device adjustment instruction according to the voice location information;
the camera device is configured to adjust a photographing area of the camera device according to the adjustment instruction.

4. A video conference system, comprising: a conference module, a control module, and a receiving/sending module;
the control module is configured to process images and voices and realize split-screen display according to the information of images and voices;
the conference module is configured to start up a conference mode according to information received by the receiving/sending module;
the receiving/sending module is configured to receive and send information, and send the information to the conference module or the control module;
wherein the video conference system further comprises a voice collection module configured to collect input voice information and send it to the receiving/sending module, and the voice collection module comprises a digital microphone array adopting beamforming technology to suppress pickup in a non-target direction, and the control module comprises:
a voice detection unit configured to detect a source of a voice collected by the voice collection module;
a split-screen display unit configured to control display positions of conference participants according to the source of the voice; and
a display switching unit configured to move a conference participant currently in a main screen display area to a sub-screen display area, and switch a conference participant of a current voice input party to the main screen display area, according to the display positions of the conference participants determined by the split-screen display unit;
wherein the display switching unit is further configured to move the conference participant currently in the main screen display area to the sub-screen display area, and display a requested file on the main screen display area, when the file is requested to be displayed; and
wherein the main screen display area and the sub-screen display area are adjacent to each other, the main screen display area has a larger size than the sub-screen display area, the main screen display area is configured to display conference image/video information or the requested file of one conference participant, and the sub-screen display area is configured to display conference image/video information of other conference participants.

5. The video conference system according to claim 4, wherein the conference module comprises a conference account application unit, a conference number generating unit, and a conference participation request unit;
the conference account application unit is configured to receive information requested by a conference applicant and record information of conference users;
the conference number generating unit is configured to generate the conference number and/or password according to the information of the conference number application unit;
the conference participation request unit is configured to receive a user's conference application and send conference application information to the control module.

6. The video conference system according to claim 5, wherein the conference application information comprises information of conference users, a conference subject, conference content.

7. The video conference system according to claim 4, wherein the conference module comprises a conference number application unit, a conference number generating unit, a conference time notification unit, and a conference participation request unit;
the conference number application unit is configured to receive information requested by a conference applicant and record information of conference users;
the conference number generating unit is configured to generate a conference number and/or password according to the information of the conference number application unit;
the conference participation request unit is configured to receive a user's conference application, and send conference application information to the control module;
the conference notification unit is configured to send conference number and/or password generated by the conference number generating unit to the conference participant, and send a conference time and a conference schedule to the conference participants according to the conference time and conference schedule scheduled in the conference number application unit.

8. The video conference system according to claim 4, wherein the split-screen display unit is further configured to dynamically set display areas of the main screen display area and the sub-screen display area according to content of the conference.

9. The video conference system according to claim 4, wherein the control module further comprises a main screen projection control unit and a sub-screen projection control unit;
the main screen projection control unit is configured to control the content display of the main screen display area; and
the sub-screen projection control unit is configured to control display positions and display information of the sub-screen display area for the conference participants.

10. The video conference system according to claim 4, wherein the control module further comprises a display request unit configured to receive a request from a conference participant and send the request to the split-screen display unit; and
the split-screen display unit is further configured to control the display positions of the conference participants according to the request of the conference participant.

11. A video conference terminal, comprising:
a camera device configured to collect conference videos of the video conference terminal;
a projection device configured to enlarge and display conference information;
a smart terminal configured to realize data interaction and information processing with other video conference terminals via Internet, transmit the conference information to the projection device in real time, and display content of the video conference terminal on splitting screens;
a voice detection unit configured to detect a source of a voice;
a split-screen display unit configured to control display positions of conference participants according to the source of the voice; and
a display switching unit configured to move a conference participant currently in a main screen display area to a sub-screen display area, and switch a conference participant of a current voice input party to the main screen display area, according to the display positions of the conference participants determined by the split-screen display unit;
wherein the display switching unit is further configured to move the conference participant currently in the main screen display area to the sub-screen display area, and display a requested file on the main screen display area, when the file is requested to be displayed; and
wherein the main screen display area and the sub-screen display area are adjacent to each other, the main screen display area has a larger size than the sub-screen display area, the main screen display area is configured to display conference image/video information or the requested file of one conference participant, and the sub-screen display area is configured to display conference image/video information of other conference participants.

12. The video conference terminal according to claim 11, wherein the video conference terminal further comprises a voice device configured to collect voice information of the video conference terminal and send the collected voice information to the smart terminal, the voice device comprises a digital microphone array adopting beamforming technology to suppress pickup in a non-target direction.

* * * * *